UNITED STATES PATENT OFFICE.

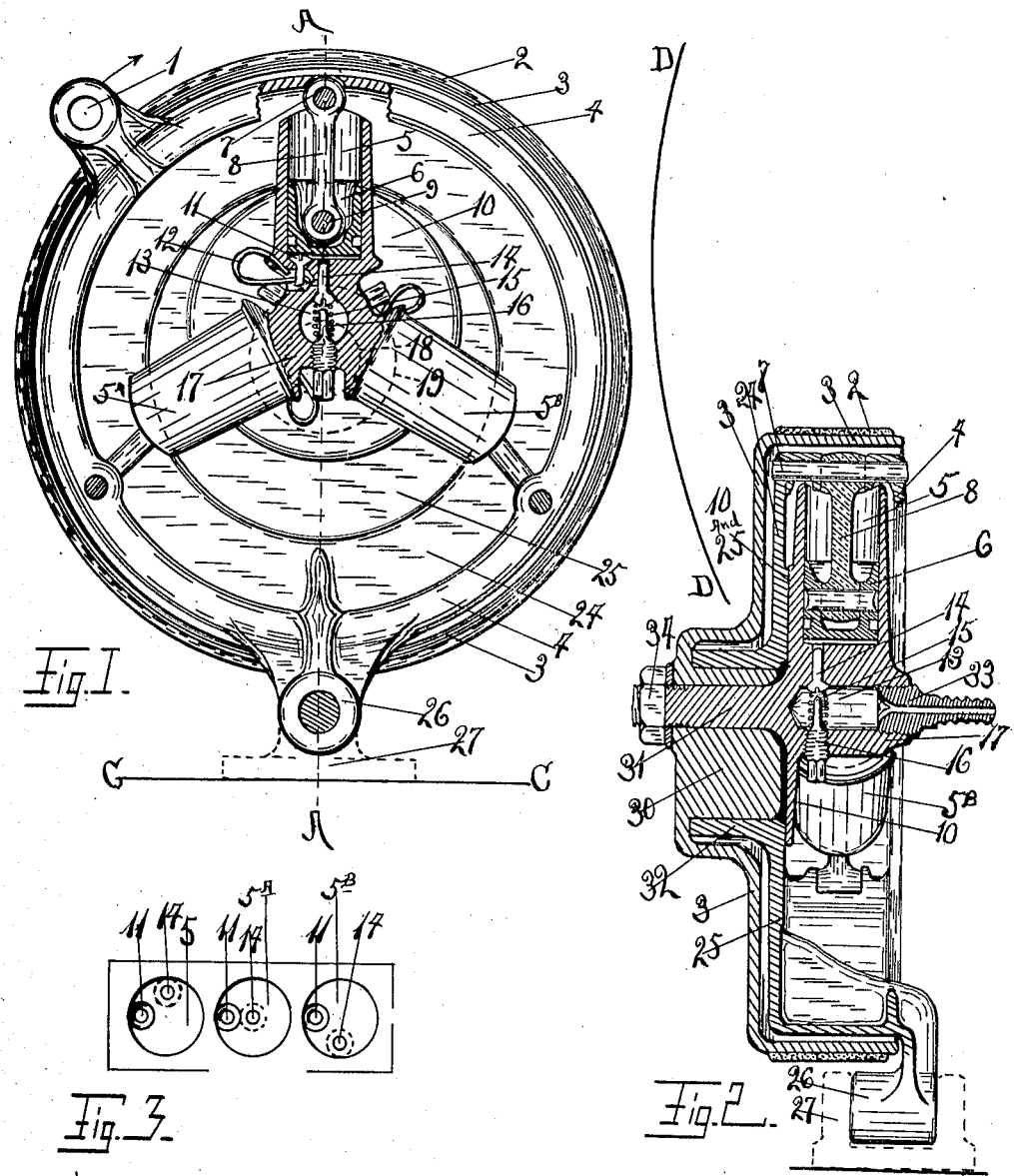

KIRK G. JOHNSTON, OF NEW YORK, N. Y.

AIR-PUMP.

No. 895,643.  Specification of Letters Patent.  Patented Aug. 11, 1908.

Application filed September 3, 1907. Serial No. 391,128.

*To all whom it may concern:*

Be it known that I, KIRK G. JOHNSTON, a citizen of the United States, residing at No. 61 East Twenty-fifth street, in the city of New York, county of New York, and State of New York, have invented a new and useful Air-Pump, of which the following is a specification.

This invention relates to improvements in air pumps for light duty such as the inflation of automobile tires or the blowing of automobile horns and the objects of the invention are, first, to provide an air pump of simple construction, light weight and little liability of getting out of repair, second, to provide an air pump that may be quickly and easily thrown in or out of action and, third, to provide an air pump, having continuous action, in which the cylinders do not revolve. These objects are attained in the mechanism illustrated in the accompanying drawing which is made part of this specification and in which—

Figure 1 is a front view of the air pump with one cylinder and the base of the several cylinders in section; Fig. 2 is a sectional view of the air pump substantially on the dotted line of A—A of Fig. 1; and Fig. 3 is a plate showing the disposition of the valves in the heads of the cylinders. The pump as shown has 3 cylinders, it may, however, have any number of cylinders that can be used to advantage.

Similar numerals refer to similar parts throughout the several figures of the drawing.

The line D—D represents the periphery of the balance wheel of the automobile against which the pump pulley 3 is pressed by a lever, or a rod connected to the lever, in the eye 1. The line C—C represents some part of the automobile frame or engine base to which the bracket 27 may be rigidly fixed. The main arbor 24 of the pump is pivoted at 26 to the bracket 27; said main arbor 24 and its flange 4 carries the ends 7 of the connecting rods 8 which are pivotally 9 attached to the piston 6 in the cylinders 5, 5ᴬ and 5ᴮ: said cylinders are attached to (are one piece with) the base 17 in which is formed a chamber 13 adapted to receive the discharge from the cylinders 5, 5ᴬ and 5ᴮ through the valves 14 which are normally held in a closed position by the springs 15 on the threaded plugs 16.

In a sleeve portion 32 at the center of the said main arbor 24 is journaled the journal 30 of the leather faced 2 pulley 3; into this journal 30 of the pulley 3 is eccentrically pivoted the cylinder base 17, an extension of which is the pivot 31, held in position by the nut 34, which also holds the entire pump together and the guides, composed of the plate 25 on the main arbor 24 and the plate 10 on the cylinder base 17, in contact.

It will be noted that, although the cylinder base 17 and the cylinders 5, 5ᴬ and 5ᴮ are carried around the dotted circle 18 at each revolution of the pulley 3, the cylinders do not revolve and that there is, therefore, no necessity for a packed revolving joint in the hose connection 33, thus relieving the pump of tendency to leak. The cylinders are supplied with air during the outward stroke of the pistons through the valves 11 which are normally held closed by the springs 12.

In operation the pump is pivotally attached to the automobile frame or the engine base by the eye 26 in such position that it may be pressed against the periphery of the balance wheel B—B, to the eye 1 is attached a lever connection to a foot pedal or other source of action; a hose of sufficient length to reach the wheels is attached to the hose connection 33 and a lead of hose, provided with a cut-off, is carried to the horn from the said wheel hose. When it is desired to blow the horn the pump is lightly pressed against the balance wheel, and when a tire is to be inflated, said horn lead is cut off, and the pump is held firmly against the balance wheel. The pump may be held normally away from the balance wheel by a spring of any design. It is thus seen that the pump is always ready for action without the necessity of making connections.

Having thus described the invention I claim as new, novel and useful:—

1. In an air pump, the combination with a plurality of cylinders and inlet and outlet valves therefor of a central base for said cylinders, about which they are symmetrically disposed and to which they are rigidly attached, said base being formed with a chamber into which the cylinders are adapted to discharge, a discharge member adapted to be connected to a hose threaded into said chamber, said base being also provided with a central projection, a friction pulley constructed with a journal at its center, which is provided with an eccentric bearing for said projection, a flanged pivoted supporting frame having at its center a bearing to receive said pulley journal, pistons in said cylinders, connecting rods pivoted to the flange of said frame and to said pistons, and a driving wheel, said frame being adapted to be moved to bring the friction pulley in contact with the driving wheel, substantially as and for the purpose set forth.

2. In an air pump the combination with a flanged supporting frame having a bracket and a central bearing, of a base to which said bracket is pivoted, a friction pulley having a central journal in which there is an eccentric bearing fitted to said central bearing in the supporting frame, a plurality of cylinders and inlet and outlet valves therefor, a central base for said cylinders about which they are symmetrically disposed and to which they are rigidly attached, said cylinder base being formed with a discharge chamber and a central projection by which it is pivotally mounted in said eccentric bearing, pistons in said cylinders, connecting rods pivoted to said pistons and to the flange of the supporting frame, substantially as and for the purpose set forth.

3. In an air pump, the combination with a supporting frame of a rotary driving member mounted therein, a cylinder pivotally mounted in said driving member upon an axis eccentric to said member, valve-controlled inlet and outlet passages leading to and from said cylinder, a piston relatively reciprocable in said cylinder, and means of flexibly connecting said piston with said frame, substantially as and for the purpose set forth.

In testimony whereof I have affixed my signature to this specification in the presence of the two subscribing witnesses.

KIRK G. JOHNSTON.

Witnesses:
    E. P. McGAVOCK,
    RUFUS HOWARD.